United States Patent Office 3,516,867
Patented June 23, 1970

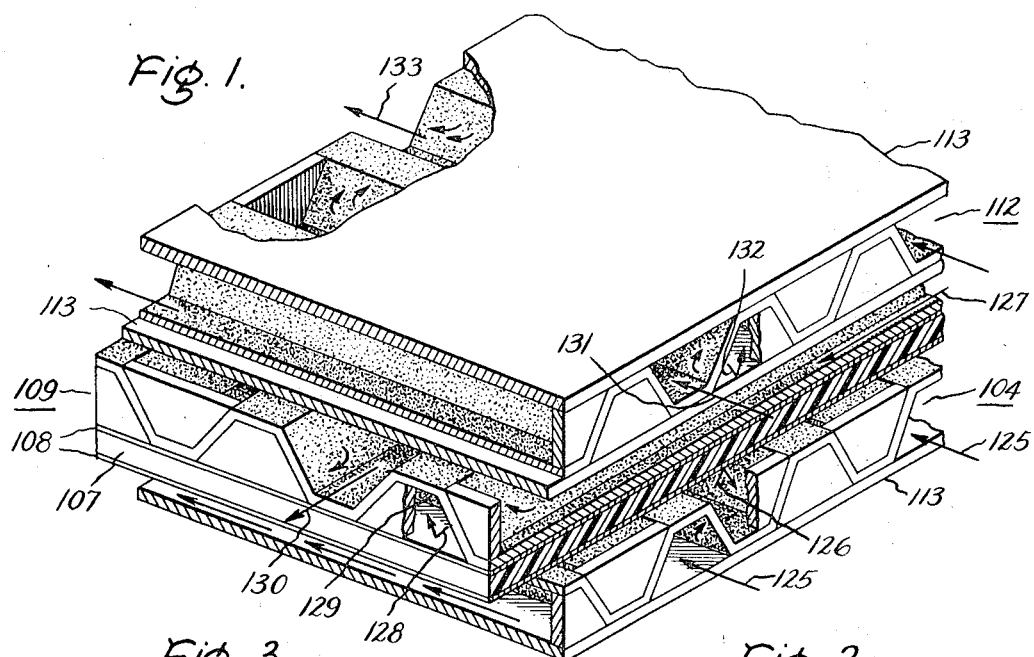
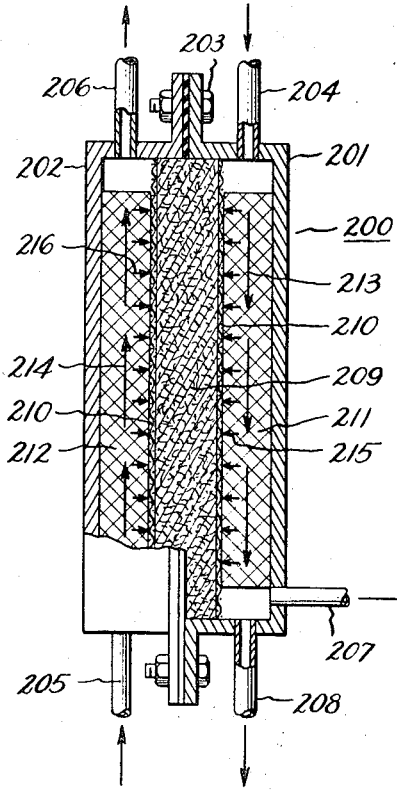
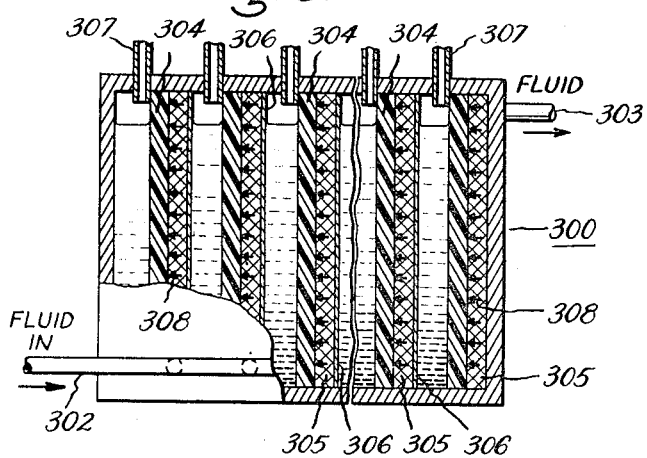
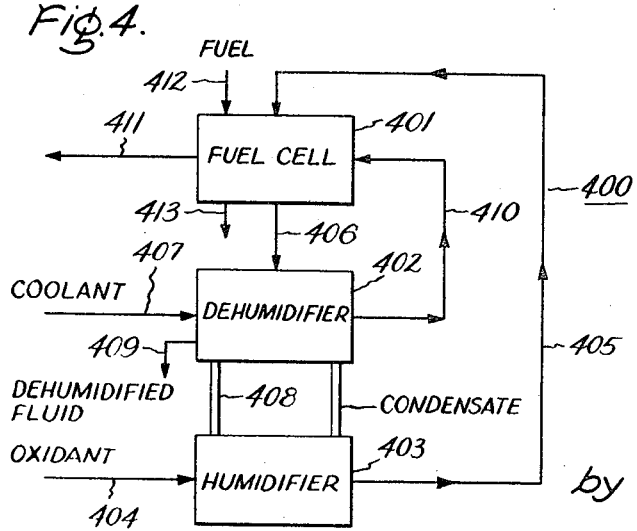
Inventor:
Joseph P. Dankese,
His Attorney.

3,516,867
FUEL CELL SYSTEM WITH DEHUMIDIFIER AND HUMIDIFIER
Joseph P. Dankese, Dorchester, Mass., assignor to General Electric Company, a corporation of New York
Original application Sept. 25, 1964, Ser. No. 399,494, now Patent No. 3,432,357, dated May 11, 1969. Divided and this application Jan. 10, 1968, Ser. No. 714,385
Int. Cl. H01m 27/14
U.S. Cl. 136—86                                    2 Claims

ABSTRACT OF THE DISCLOSURE

A power generating system utilizing a humidifier and dehumidifier with each of the fuel cells, as well as the humidifiers and dehumidifiers including a perforated, corrugated sheet to enhance uniform distribution of a stream of fluent material such as fuel or oxidizer.

---

This is a division of my application Ser. No. 399,494, filed Sept. 25, 1964, entitled "Fluent Material Distribution System," now Pat. No. 3,432,357 issued Mar. 11, 1969.

This invention relates to a new and improved power system incorporating fluid distribution system capable of effecting a uniform, efficient, and controlled contact between a fluid and an extended surface.

It will be immediately recognized that efficient systems for the contact of fluent materials with extended surfaces are of fundamental importance in the present state of technological development. Fluids are contacted with extended surfaces to effect an energy and/or mass transfer therebetween. Systems contacting fluids with extended surfaces for the purpose of energy transfer are basic to the fields of heat transmission and refrigeration while systems contacting fluids with extended surfaces for the purpose of mass transfer find application in the fields of absorption-desorption, humidification-dehumidification, solvent extraction, dialysis, drying, evaporation, mixing, material transport, and others.

Whether the purpose in contacting a fluid with a surface is to achieve energy transfer, mass transfer, or a combination of the two, the problems encountered in distributing the fluid to the surface are similar. An initial consideration is to insure that all portions of the fluid contact the surface. When a body of fluid is flowing parallel to a surface under laminar flow conditions, the fluid may be effectively insulated from the surface by a thin layer of stagnant fluid moving at near zero velocity. The mass and/or energy transfer is limited to that which can effectively penetrate the stagnant film. One solution is to employ turbulent fluid flow insuring contact of the surface with all portions of the fluid. Turbulent as opposed to laminar flow may, however, be imparted to a given fluid only by the utilization of relatively high pressure and velocity ranges.

An alternate expedient to insure total fluid contact with a surface, applicable to both laminar and turbulent flow, is to circulate fluid in contact with a surface over a tortuous or circuitous flow path. This expedient likewise has certain inherent disadvantages. Flow paths sufficiently tortuous or circuitous to allow total fluid contact may produce undesirably high pressure losses. Further, when fluid is contacted with a surface of substantial areal extent, the fluid may not act uniformly upon all portions of the surface. In the case of mass or energy transfer between a surface and a body of fluid confined to a circuitous flow path, an efficient transfer may be achieved between the fluid and surface upon initial contact but upon exit of the fluid from the circuitous flow path the fluid and surface may be substantially in equilibrium and no net transfer obtainable. In the case of combined energy and mass transfer, both the direction and rate of transfer may vary in passage along a circuitous flow path. For example, when a dry, warm fluid is contacted with a moist, cool surface, energy will transfer to the surface upon initial contact with the fluid while mass will transfer from the surface to the fluid. Upon exit of the fluid from a circuitous flow path, the fluid may be at a temperature approaching that of the surface and at such reduced temperature the fluid may transfer mass in the form of condensate to the surface.

Numerous fluid distribution systems are known to the art. Some distribution systems are inefficient in that they provide only partial contact between a fluid body and an extended surface. Other distribution systems require turbulent flow for efficient operation and are accordingly confined to high pressure, high velocity applications. Still other distribution systems achieve efficient fluid contact with an extended surface only at the expense of high pressure losses. Relatively few fluid distribution systems are capable of providing uniform fluid contact with an extended surface, and still fewer are capable of controlling the total contact of any given unit of fluid. Finally, few fluid distribution systems are adaptable to use with surfaces of significantly differing areal extent.

An appreciation of the variables which must be satisfied by a successful fluid distribution system is best imparted by reference to fuel cells as a specific example. Fuel cells typically employ two electrodes separated by an electrolyte. Fuel and oxidant are separately circulated to the electrodes in fluid form thereby producing a potential difference between the electrodes. Obviously, the circulated fluid must completely and uniformly contact the electrodes in order to obtain maximum efficiency. Further, the pressure of the circulated fluids at every point on the face of the electrodes must be controlled. Low pressures on one side of the fuel cell may allow electrode flooding while unduly high pressures may cause mechanical damage. Reaction products may be formed at either or both of the electrodes. These must be removed from the electrodes to allow efficient contact of the circulated fluids with the electrodes. Slow removal of reaction products may in some instances produce flooding and unduly high rates of reaction product removal may adversely affect the electrolyte leading to reduced efficiency and mechanical failure. The reaction of fuel and oxidant within the cell liberates heat and generates higher than ambient temperatures. These temperatures may speed the degradation of the ion exchange materials which may form the electrolyte. Consequently, the fluid distribution system must provide uniform fluid circulation to dissipate the heat of reaction. The fluid distribution system must circulate fluid to meet the above requirements with mineral pressures, velocities, and pressure drops. High flow rates will lead to waste of fuel or oxidant while high pressures may produce mechanical failures of fuel cell elements. High pressure losses undesirably increase power requirements for fluid circulation. Inasmuch as the current output of a fuel cell is directly related to the areal extent of the electrode surfaces, it is desirable that any fluid distribution system for fuel cell application be adaptable to uniform and controlled fluid contact over extended surfaces of widely differing areas.

It is an object of the invention to provide new and improved heat exchangers, humidifiers, dehumidifiers, and other devices capable of effecting energy and/or mass transfer between a surface and a fluid.

It is still a further object of the invention to provide a new electrical generating system and a process of circulating fluid thereto.

FIG. 1 is a perspective view with portions shown in section and portions broken away of a fuel cell detail.

FIG. 2 is an elevation, partly in vertical section, of an energy and/or mass transfer apparatus.

FIG. 3 is an elevation, partly in vertical section, of a humidifier.

FIG. 4 is a schematic illustration of an electrical power generation system.

The operation of a fuel cell in the electrical power generating system of the instant invention is best understood by reference to a single cell schematically illustrated in FIG. 1. Fuel enters the channels of fuel assembly 104 at one end through unplugged downwardly opening channels as indicated by arrow 125. Fluid may flow the entire length of the channels without encountering any substantial pressure drop but is prevented from flowing completely through the assembly in the downwardly opening channel by a plug placed at the end of the channel opposite to fluid entrance.

Inasmuch as pressure is substantially uniform throughout the length of the entrance channel, fuel uniformly penetrates the perforate ribs forming each side of the entrance channel and is directed upwardly at an acute angle with respect to the electrolyte 107. The nozzle apertures provided in the perforate sheet material effectively convert the pressure energy in the entrance channels to velocity energy causing impingement of the circulated fuel with the catalytic material 108 as illustrated by arrows 126.

Upon contact of the fuel with the catalytic material 108, it is oxidized to the ionic form by the loss of one or more valence electrons. The electrons given up by the fuel contacting the catalytic material 108 may be collected from the face of the catalytic material by the contacting portions of the distribution system 104. It will, accordingly, be appreciated that the fuel distribution system performs the additional function of current collector, which normally requires a separate structural element.

Assuming a cation permeable electrolyte, the fuel in ionic form will penetrate the electrolyte 107. Simultaneous with fuel oxidation, oxidant will enter the oxidant assembly as indicated by flow arrow 127. Oxidant will similarly be directed to impinge on the upper body of catalytic material 108 as indicated by flow arrow 128. The oxidant upon contacting the catalytic material will be reduced by the gain of electrons. Electrons for the reduction may suitably be supplied by the portions of the oxidant assembly 109 contacting the catalytic material 108. Thus, the oxidant assembly additionally functions as a current collector for the fuel cell.

Oxidant and fuel ions may react in situ. In an exemplary situation when the fuel is hydrogen and the oxidant is oxygen, the reaction product will be water. Inasmuch as the electrolyte may utilize water as an ion transport media, a portion of the water must remain in the electrolyte. However, the accumulation of excess amounts of water at the oxygen-catalyst interface will effectively insulate the oxygen from the catalyst and slow the rate of oxygen reduction and hence the rate at which electrons are transferred. Inasmuch as the oxidant assembly 109 contacts oxidant with catalytic material through cross-channel flow, the duration of oxygen contact with the catalytic material may be uniformly controlled. Accordingly, drying of the electrolyte which may lead to structural failure is avoided as well as flooding. As an optional feature absorbent material 129 is shown mounted in the downwardly opening channel and spaced from the electrolyte. A certain portion of water formed at the oxygen-catalyst interface may diffuse onto the absorbent material and recondense. The absorbent material accordingly increase the surface area and rate at which water may be diffused into the oxidant for eduction. Flow arrow 130 illustrates the eduction of oxidant from the assembly 109.

In operation, fuel cells may generate heat as well as electricity. Since high temperatures of operation will degrade the electrolyte, it may be desired to positively control operating temperatures. Coolant assembly 112 separated from oxidant assembly 109 by imperforate sheet 113 is provided for this purpose. Coolant enters the distribution system as indicated by flow arrows 131, impinges on sheet 113 as illustrated by arrows 132, and exits from system as indicated by arrows 133.

While the fuel cell as illustrated in FIG. 1 constitutes one form of the invention as described in Pat. No. 3,432,-357, referred to previously, numerous modifications will be obvious to one skilled in the art. The fuel cell has been described in conjunction with a solid electrolyte 107, however, a conventional liquid electrolyte suitably confined between catalyst faces may alternately be employed. Although the electrolyte 107 may be either cation permeable or anion permeable, the operation has been described with reference to a cation permeable electrolyte. If an anion permeable electrolyte were employed, oxidant ions would penetrate the electrolyte and reaction products would form in the fuel distribution system and be educted thereby. In certain applications, it may be desired to cool the fuel side of the cell rather than the oxidant side. Repositioning of the coolant distribution system or the provision of coolant distribution systems in contact with both the oxidant and fuel distribution systems is contemplated.

The fuel cell components may be formed of insulative or conductive materials as desired in order to control the electrical current generated. As an example, the fuel cell of FIG. 1 may be constructed of insulative material. The various fluid conduits external of the cell may additionally be formed of insulative material. Each of the sheets 113 adjacent the coolant assemblies 112 and remote from the oxidant assemblies 109 may be formed of electrically insulative material. In such situation, each fuel assembly 104 would serve as a cell terminal of one polarity while each oxidant assembly 109 could serve as a cell terminal of opposite polarity. The terminals of the cells may be connected in series or parallel as desired by the use of suitable wiring. In an alternate arrangement, all of the elements lying between the end plates may be formed of conductive materials, whereby the cells will be connected in series. In such case, utilization of the energy of the fuel cell would merely require electrical connection to the fuel assembly 104 adjacent the end plates. Numerous alternate choices of insulative and conductive materials are possible, including the use of additional elements provided for the sole purpose of electrical insulation.

Each of the channeled perforate sheet assemblies 104, 109, and 112, taken together with the imperforate sheets mounted in contact with the opposed faces thereof, form a fluid distribution system of the type shown in the previously referred to Pat. No. 3,432,357, of which the instant application is a division. Any one of the fluid distribution systems shown mounted in the fuel cell shown may be replaced with a fluid distribution system of the type shown there. It will be appreciated therefore that the portion of the fuel cell shown in FIG. 1 lying beneath the perforate sheet assembly 112 may take the form of any one of the opposed face distribution systems, shown in the said patent. Further, the portion of the fuel cell illustrated in FIG. 1 lying above perforate sheet assembly 104 may also take the form of any one of the single face fluid distribution systems shown there. Other obvious structural variations in the fuel cell 100 are possible.

FIG. 2 illustrates an apparatus 200 comprised of two portions 201 and 202 forming a housing which are joined by bolt assemblies 203. Fluid is supplied to the housing portions 201 and 202 by conduits 204 and 205, respectively. Housing portion 202 is provided with an exhaust conduit 206. Housing portion 201 is provided with two exhaust conduits 207 and 208. The housing forms a chamber mediate which is mounted a partition 209 faced with fluid pervious elements 210 on either face. Channeled sheet assemblies 211 and 212 are mounted in the housing chamber in contact with the elements 210 within housing portions 201 and 202, respectively. The channeled sheet assemblies 211 and 212 are schematically shown and may take the form of any of the assemblies shown in the aforementioned patent.

For purposes of describing a specific application of the invention, apparatus 200 may be considered a humidifier-dehumidifier to which warm moist air is supplied through conduit 204 and cool, dry air is supplied through conduit 205. Warm, moist air upon entering the apparatus 200 will be displaced downwardly within the channeled sheet assembly 211 as indicated by flow arrows 213. Simultaneously, the arm air will be impinged against the pervious element 210 as indicated by impingement arrows 216. Moist air may also penetrate into the partition 209.

Simultaneously, cool, dry air will be displaced upwardly in the channeled sheet assembly 212 as indicated by displacement arrows 214 and impinged against element 210 as indicated by impingement arrows 216. The cool, dry air may penetrate the pervious element 210 and into a portion of the partition 209.

Due to the temperature differential across the apparatus, a portion of the water vapor in the warm air stream may condense within the partition 209 and upon the pervious element 210. Because of both the temperature differential and the humidity differential across the apparatus, the cool air stream upon penetrating the partition 209 may pick up a portion of the condensed water. In certain situations more water may be condensed by the humid air stream than can be diffused into the dry air stream. In such case, the excess water will migrate to the lower portion of the housing chamber and be removed through conduit 208. The entering warm, humid air upon exhaust through the conduit 207 will be at a reduced temperature and humidity. Similarly, the cool, dry entering air upon exhaust through the conduit 206 will be at an elevated temperature and humidity. Of course, humidification-dehumidification may also take place without benefit of a temperature differential between the separate air streams.

In certain instances, it may be desired to employ an impervious partition in place of the pervious partition 209 illustrated. In such instances the apparatus will function efficiently as a dehumidifier with a temperature differential across the apparatus and without regard to the comparative humidities of the respective air streams.

In addition to utilizing apparatus of the type shown in FIG. 2 as an indirect dehumidifier and as a humidifier-dehumidifier, such apparatus may be employed as a fuel cell. If, for example, housing portions 201 and 202 are either electrically insulated or formed of electrically nonconductive materials, partition 209 may be either a solid or liquid electrolyte. Elements 210 in contact with either face of the electrolyte may include catalytic materials. Accordingly, when fuel and oxidant are separately supplied through conduits 204 and 205, electrical energy will be produced by the cell.

Apparatus 200 will be noted to constitute an opposed face counter-current distribution system such as system 49 shown in FIG. 25 of the aforementioned patent. By the simple expedient of relatively rotating the housing portions 201 and 202, either a cross-current or concurrent opposed face distribution system such as shown in the various figures of the said patent.

A still further specific application of the invention is illustrated in FIG. 3 which shows a humidifier 300. The humidifier is comprised of a housing 301 to which fluid to be humidified is supplied through conduit 302 and from which humidified fluid is exhausted through conduit 303. Liquid permeable partitions 304 are mounted within the housing 301 at spaced intervals to form mass transfer surfaces. Channeled sheet assemblies 305 are mounted adjacent each mass transfer surface and are provided with imperforate sheets 306 adjacent the face remote from each transfer surface. The channeled sheet assemblies 305 may take the form of any of the channeled sheet assemblies shown in Pat. No. 3,432,357.

Water or any other liquid having a significant vapor pressure under operating conditions may be supplied to the housing 301 through conduits 307. Liquid will penetrate the partitions 304 so as to form a film on the surface of the partition adjacent the channeled sheet assembly 305. Air or any other gas capable of evaporating liquid is supplied to the channeled sheet assembly 305 through inlet conduit 302. The gaseous material will impinge on the liquid film as indicated by impingement arrows 308. The gaseous material together with liquid converted to the vapor phase will be exhausted from the apparatus 300 through exhaust conduit 303.

FIG. 4 schematically illustrates an electrical power generating system 400 comprised of a fuel cell 401, a dehumidifier 402, and a humidifier 403. The fuel cell 401 is supplied with fuel, oxidant, and coolant. A suitable fuel cell is illustrated in FIG. 1, inclusive, although other forms of fuel cells may be employed. The dehumidifier 402 may be of the construction shown in FIG. 1, although dehumidifiers having impermeable partitions are preferred. The humidifier 403 is preferably of the construction shown in FIG. 3.

Oxygen is supplied to the generating system 400 through conduit 404 which is connected to the humidifier 403. Humidified oxidant is conducted from the humidifier 403 to the fuel cell 401 through conduit 405. The oxidant is humidified to prevent excessive drying of the electrolyte within the fuel cell. A portion of the oxidant will be reacted within the fuel cell while the remainder of the oxidant may be used to educt the reaction products formed. When the reaction product is water, it may be desired to recover a portion of the water to humidify the incoming oxidant. Accordingly, excess oxidant and a portion of the reaction products are exhausted from the fuel cell through conduit 406 and conducted to the dehumidifier 402.

Coolant is supplied to the dehumidifier 402 through conduit 407. Energy transfer from the oxidant-reaction product mixture to the coolant condenses at least a portion of the reaction product. The condensed portion of the reaction product will be supplied to the humidifier through conduits 408. The remainder of the oxidant-reaction product mixture will be exhausted through conduit 409.

Coolant is transported from the dehumidifier to the fuel cell through conduit 410 and is exhausted from the fuel cell through conduit 411. Fuel is supplied to the fuel cell through conduit 412 and may, if desired, be exhausted through conduit 413.

The power generating system 400 is preferred to be operated on fuel and oxidants which yield water as a reaction product. In a preferred form the dehumidifier 402 and humidifier 403 may be thermally insulated to function adiabatically thus being independent of ambient temperature. The relative positions of the conduits supplying and exhausting fluids to the fuel cell, dehumidifier, and humidifier are chosen for convenience of illustration only and are not intended to limit the scope of the invention.

While the invention has been elaborately described and illustrated, still other combinations and variations will be obvious to one skilled in the art. It is, accordingly, intended that the scope of the invention be determined by reference to the following claims.

What I claim as new and desire to secure by Letters Patent of the United States is:

1. An electrical power generating system comprising
   a fuel cell,
   a dehumidifier,
   a humidifier,
   means supplying oxidant to said humidifier,
   means directing humidified oxidant from said humidifier to said fuel cell,
   means supplying coolant to said dehumidifier, means directing coolant from said dehumidifier to said fuel cell,
means supplying fuel to said fuel cell,
means directing excess oxidant and reaction products from said fuel cell to said dehumidifier,
means directing condensed reaction products from said dehumidifier to said humidifier, and
means directing baseous oxidant and reaction products from said dehumidifier.

2. An electrical power generating system according to claim 1 in which at least one of said fuel cell, dehumidifier, and humidifier include a corrugated fluid distribution means.

References Cited
UNITED STATES PATENTS

| | | | |
|---|---|---|---|
| 3,061,658 | 10/1962 | Blackmer | 136—86 |
| 3,112,228 | 11/1963 | Young | 136—86 |

ALLEN B. CURTIS, Primary Examiner